(12) United States Patent
Wong et al.

(10) Patent No.: US 6,199,058 B1
(45) Date of Patent: Mar. 6, 2001

(54) REPORT SERVER CACHING

(75) Inventors: Simon Wong, Redwood Shores; Stewart Wilson, Alameda; Marco Tilli, Hayward, all of CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/313,130

(22) Filed: May 17, 1999

Related U.S. Application Data

(63) Continuation of application No. 08/808,102, filed on Feb. 28, 1997, now Pat. No. 5,978,787.

(51) Int. Cl.[7] ............................................ G06F 17/30
(52) U.S. Cl. .................................................... 707/2
(58) Field of Search ....................................... 707/2

(56) References Cited

U.S. PATENT DOCUMENTS

| | | | |
|---|---|---|---|
| 5,008,853 | 4/1991 | Bly et al. ............................ | 345/331 |
| 5,168,444 | * 12/1992 | Cukor et al. ......................... | 705/1 |
| 5,625,818 | 4/1997 | Zarmer et al. ....................... | 707/104 |
| 5,694,608 | 12/1997 | Shostak .............................. | 707/506 |
| 5,727,220 | 3/1998 | Hohensee et al. .................... | 707/513 |
| 5,799,322 | 8/1998 | Mosher, Jr. ......................... | 707/202 |
| 5,826,253 | 10/1998 | Bredenberg ........................... | 707/2 |
| 5,873,097 | * 2/1999 | Harris et al. ........................ | 707/203 |
| 5,895,455 | * 4/1999 | Bellinger et al. .................... | 705/35 |

* cited by examiner

Primary Examiner—Wayne Amsbury
(74) Attorney, Agent, or Firm—Hickman Palermo Truong & Becker LLP; Edward A. Becker

(57) ABSTRACT

A method and apparatus for processing reports is disclosed. After receiving a current report request, a duplicate job detection (DJD) key is generated based upon the current report request. The DJD key is then compared to DJD keys associated with previous report requests to determine whether the currently requested report has been previously requested. If the currently requested report has been previously requested, then a saved report generated in response to the previous report request is retrieved. Otherwise, a new report is generated based upon the current report request and then stored.

22 Claims, 6 Drawing Sheets

CONTENTS OF A REPORT REQUEST

| REPORT CONTENT INFORMATION | OTHER REPORT INFORMATION |
|---|---|
| 1. REPORT DEFINITION FILENAME (RDF) | 1. DESTINATION DEVICE TYPE |
| 2. USER ID | 2. DESTINATION FILENAME |
| 3. DESTINATION FILE FORMAT | 3. PERFORMANCE PARAMETERS |
| 4. USER PARAMETERS | 4. TIME TOLERANCE |

CONTENTS OF A DJD KEY

"RDF / USER ID / DESTINATION FILE FORMAT / USER PARAMETER 1 / ... / USER PARAMETER N"

FIG. 5

CONTENTS OF A REPORT CACHE TABLE ENTRY

| DJD KEY FIELD | CREATION TIME FIELD | REPORT STATUS FIELD | REPORT LOCATION FIELD |
|---|---|---|---|
| 602 | 604 | 606 | 608 |

FIG. 6

REPORT SERVER CACHING

This application is a continuation of application Ser. No. 08/808,102 filed Feb. 28, 1997, now U.S. Pat. No. 5,978,787.

FIELD OF THE INVENTION

The present invention relates to database systems, and more specifically, to a method and apparatus for processing reports using report caching.

BACKGROUND OF THE INVENTION

With conventional client-server database report processing a client application spawns a report process which executes on the client system. The report process processes a report by requesting data from a database server process executing on a database management system which in turn retrieves data from a database. Although relatively simplistic in implementation, this approach requires that a new report process be spawned for each requested report, which can strain the resources of the client system, particularly when many reports are requested simultaneously.

To reduce the processing burden on client systems, some contemporary database report processing systems have implemented a "multi-client report server" approach, which involves transferring report processing from the client system to a different processor, such as the database system processor itself. According to the multi-client report server approach, client applications submit report requests to a report server process, executing on the database system processor, which manages the processing of reports. This approach can significantly reduce the processing burden on client systems which is attributable to report processing. However, even with the multi-client report server approach, the same report is sometimes requested by several different clients. Regenerating the same report for each client wastes system resources and can strain system resources when the same report is requested simultaneously by different clients. For example, identical financial market reports are often requested by several different clients simultaneously.

One approach for avoiding having to regenerate the same report for different clients is the "pre-generation approach" which involves generating and storing all possible reports based upon all combinations of report parameters and then periodically regenerating and restoring the reports to keep them current. When a report request is received, a stored report matching the requested parameters is retrieved instead of regenerating the report. This approach reduces the impact on system resources because each report only has to be generated once per refresh period, regardless of how many times the report is requested.

Despite the benefits of the pre-generation approach, it is not without its disadvantages. Specifically, all possible report combinations must be generated and stored, irrespective of how frequently the reports are actually requested. As the number of report parameters increases, the number of possible reports can become exceedingly large, requiring more system resources to generate and store the reports. Moreover, some reports may never be requested which wastes system resources to generate and store the reports. Consequently, the pre-generation approach is best suited for use with a small number of report parameters.

In view of the system resources required to process database reports in multiclient report server environments and the limitations inherent in the pre-generation approach, a method of processing database reports in a multi-client report server system which reduces the burden on system resources attributable to database report processing is highly desirable.

SUMMARY OF THE INVENTION

According to one aspect of the present invention, a method is provided for processing reports. After receiving a current report request, a determination is made as to whether a report specified by the current report request has been requested prior to receiving the current report request. If the report was requested by a previous report request prior to receiving the current report request, then the report that was generated in response to the previous report request is retrieved. If, on the other hand, the report was not requested by a previous report request prior to receiving the current report request, then a report specified by the current report request is generated and stored.

According to another aspect of the present invention, a method is provided for processing reports. After receiving a current report request, a report parameter associated with the current report request is compared to a report parameter associated with a previous report request which was received prior to receiving the current report request to determine whether a report specified by the current report request is the same as a report specified by the previous report request. If the report parameter associated with the current report request is the same as the report parameter associated with the prior report request, then a report that was generated in response to the prior report request is retrieved. If, on the other hand, the report parameter associated with the report request is not the same as the report parameter associated with the prior report request, then a report specified by the report request is generated and saved.

According to another aspect of the present invention, a computer system having a storage medium with a report table stored thereon is provided. The report table includes a set of report parameters specifying the contents of a report associated with the report table and a set of status data specifying the status of the report associated with the report table.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 illustrates the contents of a report request according to an embodiment of the present invention;

FIG. 5 illustrates the contents of a duplicate job detection (DJD) key according to an embodiment of the present invention; and FIG. 6 illustrates the contents of a report cache table entry according to an embodiment of the present invention.

DETAILED DESCRIPTION OF THE PREFERRED EMBODIMENT

A method and apparatus for processing reports in a multi-client report server system is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
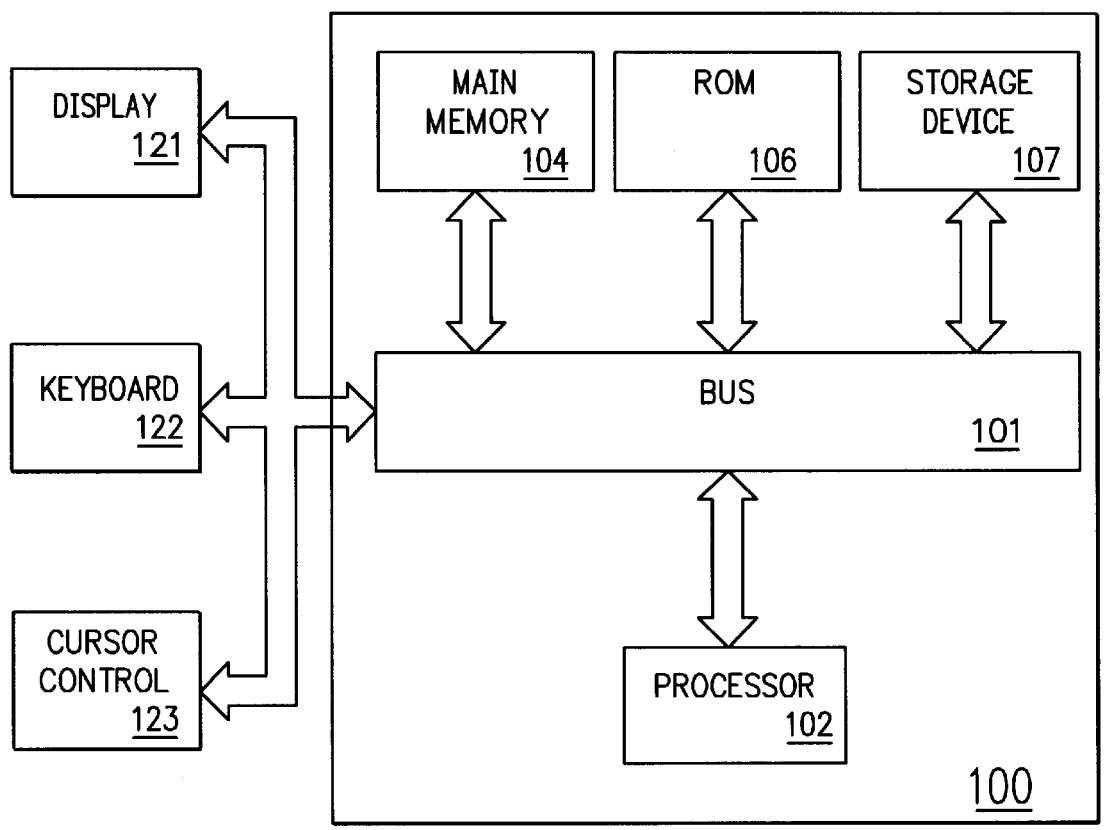
FIG. 1 is a block diagram of a computer system on which the present invention may be implemented.

FIG. 1 is a block diagram of a computer system 100 upon which an embodiment of the present invention can be implemented. Computer system 100 includes a bus 101 or other communication mechanism for communicating information, and a processor 102 coupled with bus 101 for processing information. Computer system 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

A data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. Computer system 100 further includes a keyboard 122 and a cursor control 123, such as a mouse.

The present invention is related to the use of computer system 100 to process reports in a multi-client report server system. According to one embodiment of the present invention, the processing of reports is performed by computer system 100 in response to processor 102 executing sequences of instructions contained in memory 104. Such instructions may be read into memory 104 from another computer-readable medium, such as data storage device 107. Execution of the sequences of instructions contained in memory 104 causes processor 102 to perform the process steps that are described hereafter. In alternative embodiments, hard-wired circuitry may be used in place of or in combination with software instructions to implement the present invention. Thus, embodiments of the present invention are not limited to any specific combination of hardware circuitry and software.

System Overview

Figure 2:
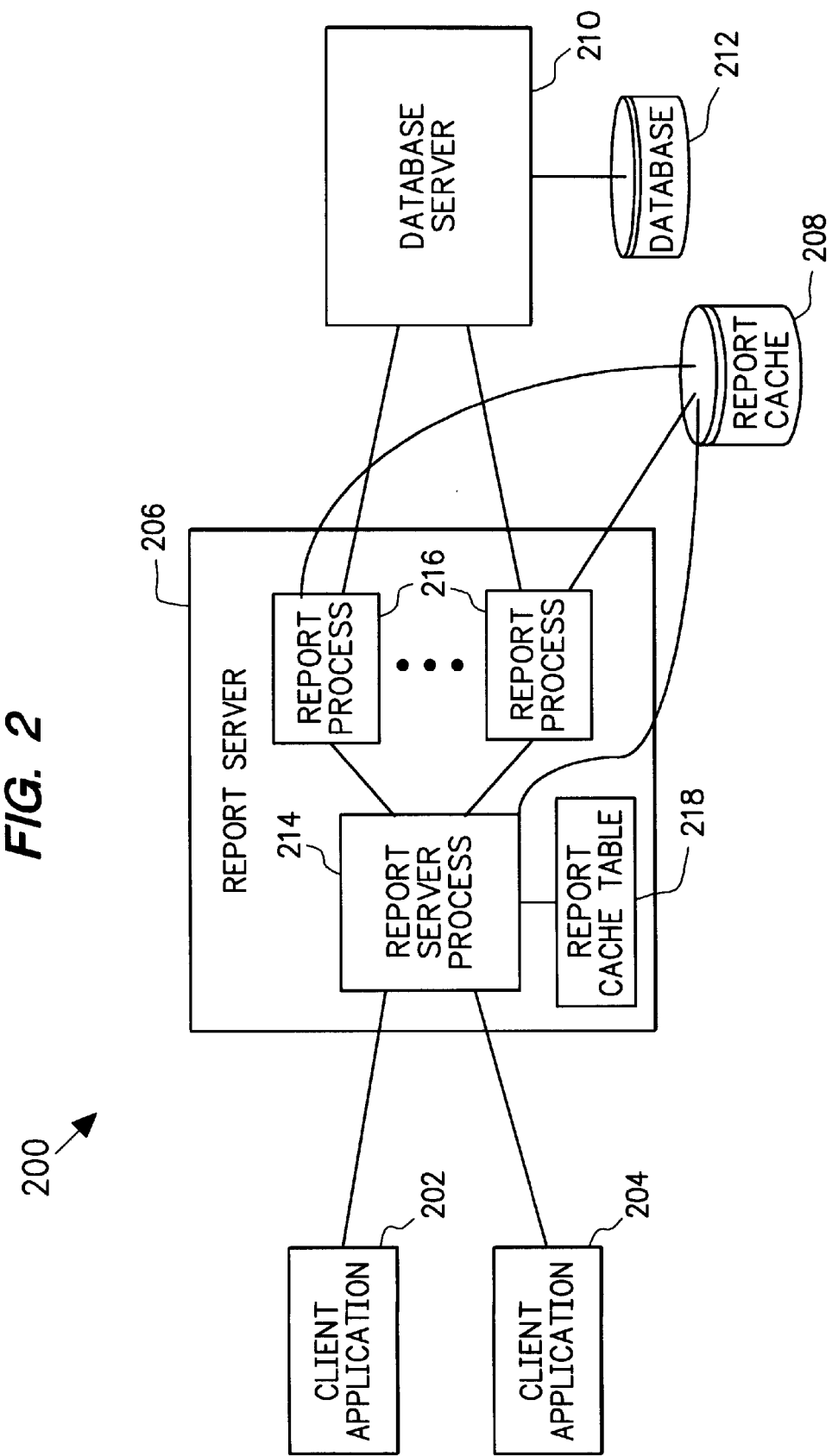
FIG. 2 is a block diagram illustrating a system for processing reports according to an embodiment of the present invention.

FIG. 2 illustrates a multi-client report server system 200 for processing reports according to an embodiment of the present invention. The system 200 includes client applications 202, 204, a report server 206, a report cache 208, a database server 210, and a database 212. Report server 206 includes a report server process 214, one or more report processes 216 and a report cache table 218. Database 212 includes database system files and data files stored on a nonvolatile storage medium, such as one or more disks. Report cache 208 stores reports generated according to an embodiment of the present invention on a nonvolatile storage medium, such as one or more disks.

While in some embodiments of the present invention, client applications 202, 204, report server 206 and database server 210 execute on different processors, in alternative embodiments the client applications 202, 204, report server 206 and database server 210 may be executing on any number of processors, including a single processor.

Functional Overview

To process a report according to an embodiment of the present invention, client applications 202, 204 submit report requests to report server process 214. When report server process 214 receives a report request, hereinafter referred to as the "current report request," from one of the client applications 202, 204, report server process 214 then determines whether the report specified by the current report request was previously requested in another, previously received report request. To make this determination, report server process 214 compares the report parameters specified in the current report request to report parameters specified in report requests received prior to the current report request.

If the report specified by the current report request was specified by another report request received prior to the current report request, then report server process 214 retrieves the previously requested report from report cache 208. If, on the other hand, the report specified by the current report request was not specified in another report request received prior to the current report request, then report server process 214 causes a report specified by the current report request to be generated and saved in report cache 208 along with the content related report parameters specified in the current report request.

According to another embodiment of the present invention, some of the report requests received prior to the current report request are not evaluated in determining whether the report specified by the current report request has been previously requested. More specifically, only those report requests received prior to and within a specified time of the current report request are used in the comparison. As a result, a stored report will only be used when the report request associated with the stored report both specifies the same report as the current report request and was received within a specified time of the current report request. Otherwise, a new report as specified by the current report request is generated and saved in report cache 208.

DETAILED FUNCTIONAL DESCRIPTION

A more detailed description of the specific steps involved in processing reports according to an embodiment of the present invention is now described with reference to FIGS. 2 through 6. In general, the specific steps include (1) receiving a report request, (2) generating a duplicate job detection (DJD) key, (3) comparing the DJD key to DJD keys of prior report requests, and (4) purging old reports.

Receiving a Report Request

Figure 3A:
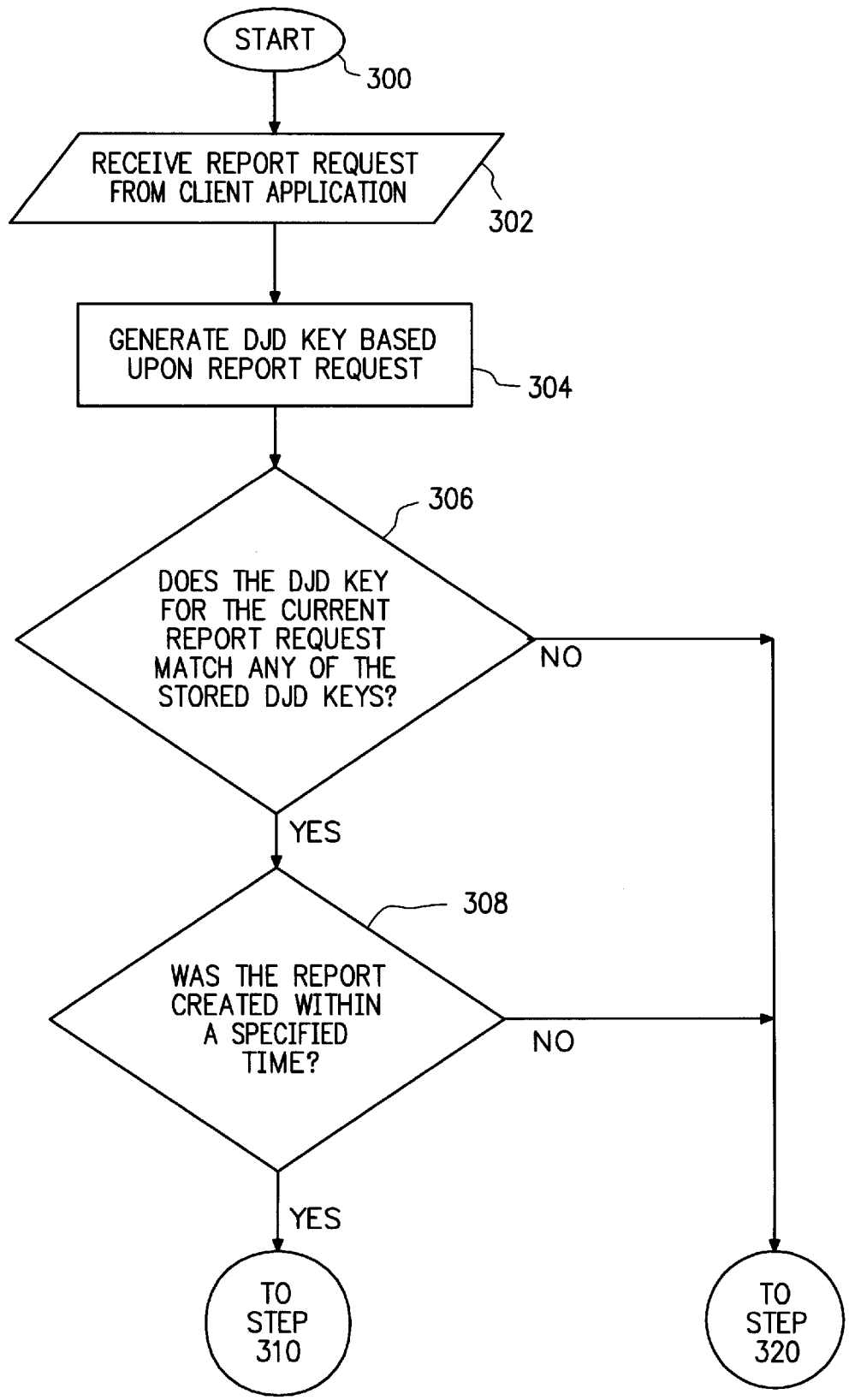
FIGS. 3A, 3B, 3C comprise a flow chart illustrating a method for processing reports according to an embodiment of the present invention.
Figure 3B:
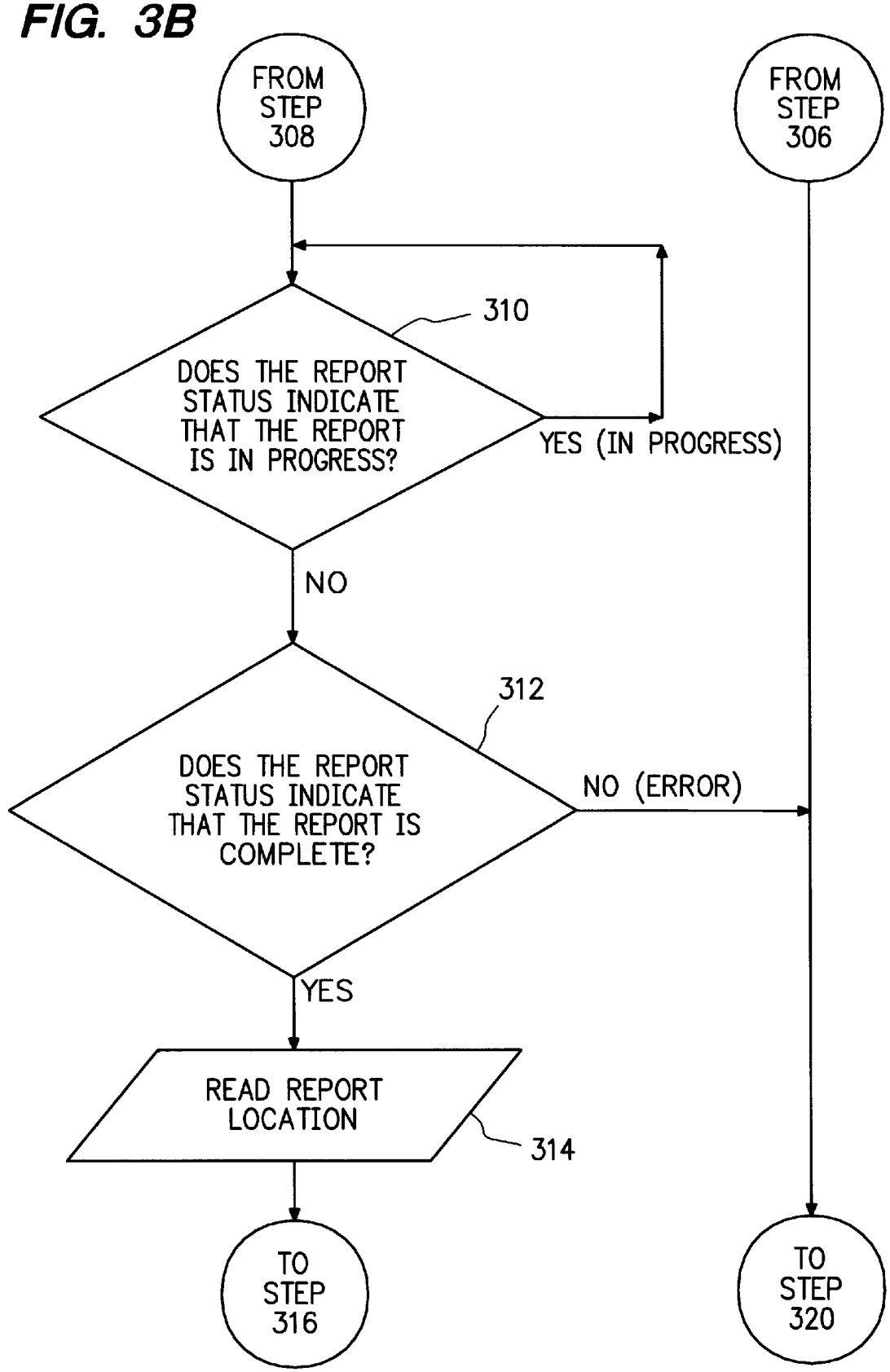
Figure 3C:
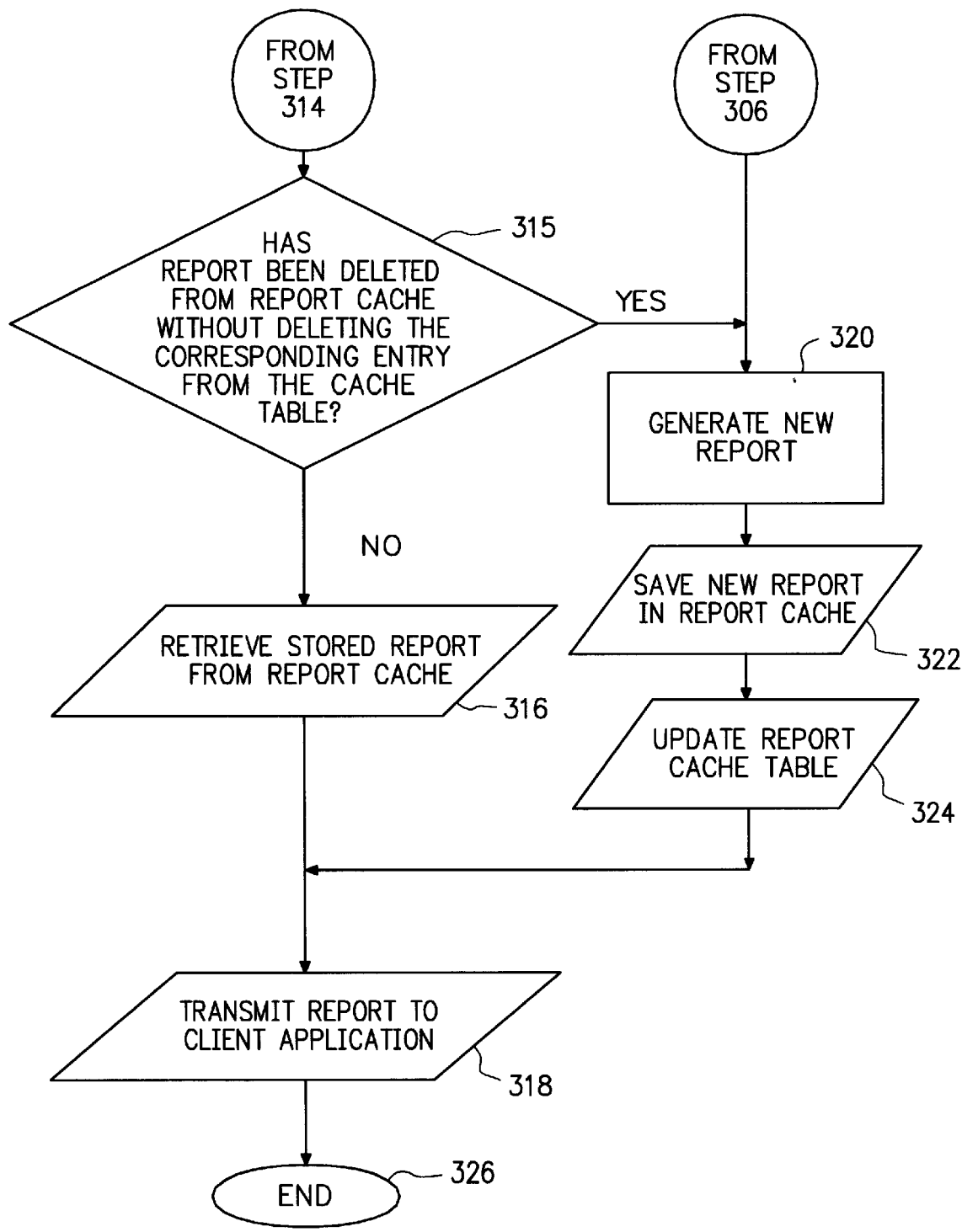

As illustrated in the flow chart of FIGS. 3A, 3B and 3C, after starting in step 300, a current report request is received by report server process 214 from one of the client applications 202, 204 in step 302. As illustrated in FIG. 4, each report request 400 contains two types of information including report content information 402, and other report information 404. The report content information 402 specifies the requested content of a report and, according to one embodiment of the present invention, includes (1) a report definition filename (RDF), (2) a user ID, (3) a destination file format, and (4) one or more user parameters. The report definition filename identifies the name of a report definition file which specifies data to be included in the report. The user ID specifies a user name associated with the report which includes the name of any databases to be used in processing the report. The destination file format parameter specifies the data format of the report such as PDF (portable document format), HTML (hypertext markup language), ASCII, or other format. The one or more user parameters are report-specific parameters which affect the content of the report.

The other report information 404 specifies general information about the report file and the way the report is generated and, according to one embodiment of the present invention, includes (1) a destination device type, (2) a destination filename, (3) one or more performance parameters, and (4) a time tolerance. The destination device type indicates the type of device to which the report is sent, such as a file, printer or other device. The destination filename specifies the name and location of the report file. The one or more performance parameters do not affect the content of the report, but rather, the environmental conditions that will be in effect while the report is being generated. For example, the performance parameters may specify the size of internal buffers to be used during the processing of the report. Finally, the time tolerance parameter specifies which previously requested reports, if any, can be used.

Generating a DJD Key

After receiving the current report request from one of the client applications 202, 204, in step 302, report server process 214 generates a duplicate job detection (DJD) key in step 304. A DJD key is a compact representation of all information contained in the current report request which affects the content of the requested report. Since the DJD key contains less information than the current report request, the DJD key can be quickly compared to DJD keys associated with prior report requests to determine whether the report specified by the current report request was previously requested by another report request.

According to one embodiment of the present invention, the DJD key includes all of the report content information 402. Turning to FIG. 5, this includes the report definition filename (RDF), the user ID, the destination file format, and the one or more user parameters represented as an ASCII character string containing "/"s as delimiters. Other DJD key formats may be used without departing from the scope of the present invention so long as the DJD key unambiguously reflects all report request information which affects report content. For example, a hash function could also be used to generate the DJD key.

Comparing the DJD Key to DJD Keys of Prior Report Requests

Once the DJD key for the current report request has been generated in step 304, in step 306 the DJD key is compared to DJD keys stored in report cache table 218 which are associated with prior report requests. Report cache table 218 contains an entry for each report which has been either already generated and stored in report cache 208, or which is being generated and has not yet been completed.

As illustrated in FIG. 6, each entry of report cache table 218 contains a DJD key field 602, a creation time field 604, a report status field 606, and a report location field 608. The DJD key field 602 contains the DJD key for the report generated from the report request. The creation time field 604 specifies the creation time of the report.

The report status field 606 indicates the current status of the report. According to one embodiment of the present invention, the report status field 606 contains a status of COMPLETED, IN-PROGRESS, or ERROR, depending upon whether the report has been successfully generated and stored in report cache 208 (COMPLETED), is currently being processed (IN-PROGRESS), or was not completed due to an error during processing (ERROR).

Finally, the report location field 608 identifies the filename and location of the file containing the report. According to one embodiment of the present invention, when a report is deleted from report cache 208, for example during the periodic purging of old reports, a value is written into report location field 608 to indicate that the report has been deleted from report cache 208. According to another embodiment of the present invention, when a report is deleted from report cache 208, the entry in report cache table 218 corresponding to the deleted report is deleted, as explained in more detail hereafter.

Returning to step 306, if report server 206 determines that the DJD key for the current report request matches a DJD key contained in one of the report cache table 218 entries (hereinafter referred to as the "matching entry"), then in step 308, a determination is made as to whether the report associated with the matching entry was created within a specified time. This is done by comparing the creation time contained in the creation time field 604 of the matching entry to the time tolerance parameter included in the current report request and the time the current report request was received.

If the report associated with the matching entry was created within the time tolerance, then in step 310, the report status of the matching entry is read from report status field 606. If in step 310, the report status is IN-PROGRESS, then the report is being generated. If in step 310 the report status indicates that the report is still in progress (IN-PROGRESS), then the report server 206 waits until the report status indicates that the report is no longer in progress. At step 312, it is determined whether the report is COMPLETE. If the report status is not complete, an error has occurred and control passes to step 320.

Once it is determined in step 312 that the report has been completed (report status of COMPLETE), then in step 314, the report location is read from the report location field 608 of the matching entry to determine the location of the report. Once the location of the report is known, at step 315 it is determined whether the location is valid. The location will not be valid, for example, if the report has been deleted from the report cache without deleting the corresponding entry from the cache table. If the location is valid, control passes to step 316. Otherwise, control passes to step 320.

In step 316, report server process 214 spawns a report process 216 to retrieve the stored report from report cache 208,or invokes a report process that has already been spawned. According to another embodiment of the present invention, instead of spawning report process 216 to retrieve the stored report, report server process 214 directly accesses report cache 208 and retrieves the stored report. Then, in step 318 the retrieved report is transmitted to the client application 202, 204 from which the current report request was received.

Returning to step 306, if the DJD key for the current report request does not match the DJD key contained in any of the report cache table 218 entries, then in step 320, report server process 214 spawns a report process 216 to generate a new report based upon the current report request, or invokes a report process that has already been spawned. Once the report is generated, then in step 322 the new report is stored in report cache 208. Then in step 324, a new entry associated with the new report is generated and stored in report cache table 218. The entry includes all of the information illustrated in FIG. 6 as previously discussed. This includes a DJD key field 602, a creation time field 604, a report status field 606 and a report location field 608. Then, in step 318, the new report is transmitted to the client application 202, 204 from which the report request was received.

Similarly, if in step 308 the report associated with the matching entry was not generated within the specified time, or if in step 312, the report status is ERROR, a new report is generated and the report cache table is updated according to steps 320, 322, and 324. Then, the process is complete in step 326.

Purging Old Reports

According to an embodiment of the present invention, old reports are purged when the size of report cache 208 exceeds a pre-set limit. Specifically, when a report output is added to the report cache 208, it is determined whether the size of the report cache 208 exceeds the pre-set limit. If the size of the report cache 208 exceeds the limit, then the oldest files in the cache are purged until the total report cache size is within the limit.

While purging in response to exceeding a size limit is one purging technique, other purging techniques are possible. The present invention is not limited to any particular purging technique. For example, reports may be periodically purged from report cache 208 based upon the creation time of the report. Thus, in financial environments where report requests specify a time tolerance of fifteen minutes, reports older than one day may be periodically deleted. The report cache table 218 entry corresponding to a deleted report may or may net be deleted from report cache table 218 in response to deletion of the report.

Although the present invention has been described in the context of database reporting environments, the present invention is also applicable to other reporting environments.

The present invention has several advantages over prior approaches for generating reports. Specifically, the present invention reduces the number of reports which need to be generated because only those reports requested are generated. As a result, unrequested reports never have to be generated. In addition, the most frequently requested reports are automatically regenerated and maintained in report cache 208 based upon the time tolerance parameter. Finally, the performance advantages provided by the present invention are independent of the number of possible report combinations, the number of client applications 202, 204 and the number of processes on which client applications 202, 204, report server 206 and database server 210 are executing.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for processing report requests, the method comprising the computer-implemented steps of:
   receiving a new report request;
   determining whether a new report specified by the new report request was previously generated within a specified time prior to a time associated with the new report request, wherein the specified time is specified by the new report request;
   if the new report satisfies a set of conditions which includes that the new report was previously generated within the specified time prior to the time associated with the new report request, then providing a previously generated report; and
   if the new report does not satisfy a set of conditions which includes that the new report was previously generated within a specified time prior to the time associated with the new report request, then generating and providing the new report.

2. The method as recited in claim 1, wherein the step of determining whether a new report specified by the current report request was previously generated within a specified time prior to a time associated with the new report request includes comparing the new report request to a previous report request.

3. The method as recited in claim 2, wherein the step of comparing the new report request to a previous report request includes comparing a report parameter associated with the new report request to a report parameter associated with the previous report request.

4. The method as recited in claim 1, further comprising the step of saving a report parameter associated with the new report request.

5. The method as recited in claim 1, further comprising the step of deleting a previously generated report that has existed for more than a specified time.

6. The method as recited in claim 1, wherein:
   the time associated with the new report request is a time the new report request was received, and
   the step of determining whether a new report specified by the new report request was previously generated within a specified time prior to a time associated with the new report request includes determining whether a new report specified by the new report request was previously generated within a specified time prior to receiving the new report request.

7. A computer-readable medium carrying one or more sequences of one or more instructions for processing report requests, the one or more sequences of one or more instructions including instructions which, when executed by one or more processors, cause the one or more processors to perform the steps of:
   receiving a new report request;
   determining whether a new report specified by the new report request was previously generated within a specified time prior to a time associated with the new report request, wherein the specified time is specified by the new report request;
   if the new report satisfies a set of conditions which includes that the new report was previously generated within the specified time prior to the time associated with the new report request, then providing a previously generated report; and
   if the new report does not satisfy a set of conditions which includes that the new report was previously generated within a specified time prior to the time associated with the new report request, then generating and providing the new report.

8. The computer-readable medium as recited in claim 7, wherein the step of determining whether a new report specified by the current report request was previously generated within a specified time prior to a time associated with the new report request includes comparing the new report request to a previous report request.

9. The computer-readable medium as recited in claim 8, wherein the step of comparing the new report request to a previous report request includes comparing a report parameter associated with the new report request to a report parameter associated with the previous report request.

10. The computer-readable medium as recited in claim 7, further comprising the step of saving a report parameter associated with the new report request.

11. The computer-readable medium as recited in claim 7, further comprising the step of deleting a previously generated report that has existed for more than a specified time.

12. The computer-readable medium as recited in claim 7, wherein:
the time associated with the new report request is a time the new report request was received, and
the step of determining whether a new report specified by the new report request was previously generated within a specified time prior to a time associated with the new report request includes determining whether a new report specified by the new report request was previously generated within a specified time prior to receiving the new report request.

13. A method for processing database report requests, the method comprising the steps of
receiving a new report request;
comparing a report parameter specified by the new report request to a report parameter specified by a previous report request to determine whether a new report specified by the new report request is the same as a prior report specified by the previous report request;
if the new report is the same as the prior report and the prior report was generated within a specified time prior to a time associated with the new report request, then providing the prior report; and
if either the new report is not the same as the prior report or the previous report was not generated within the specified time prior to the time associated with the new report request, then
generating the new report,
saving the new report, and
saving a report parameter specified by the new report request.

14. The method as recited in claim 13, wherein the step of comparing a report parameter specified by the new report request to a report parameter specified by a previous report request includes the step of comparing a first ordered ASCII string reflecting a parameter value associated with the new report request to a second ordered ASCII string reflecting a parameter value associated with the previous report request.

15. The method as recited in claim 14, further comprising the step of checking a report status of the prior report.

16. The method as recited in claim 13, wherein the time associated with the new report request is a time the new report request was received.

17. A report processing system comprising:
a report cache configured to store one or more reports; and
a report server communicatively coupled to the report cache, the report server being configured to:
receive a new report request from a client application;
determine whether a new report specified by the new report request was previously generated within a specified time prior to a time associated with the new report request;
if the new report satisfies a set of conditions which includes that the new report was previously generated within the specified time prior to the time associated with the new report request, then retrieving a previously generated report from the report cache and providing the previously generated report to the client application; and
if the new report does not satisfy a set of conditions which includes that the new report was previously generated within a specified time prior to the time associated with the new report request, then generating the new report and providing the new report to the client application.

18. The report processing system as recited in claim 17, wherein the report server is further configured to compare the new report request to a previous report request.

19. The report processing system as recited in claim 18, wherein the report server is further configured to compare a report parameter associated with the new report request to a report parameter associated with the previous report request.

20. The report processing system as recited in claim 18, wherein the report server is further configured to save a report parameter associated with the new report request.

21. The report processing system as recited in claim 18, wherein the report server is further configured to delete from the report cache a previously generated report that has existed for more than a specified time.

22. The report processing system as recited in claim 17, wherein
the time associated with the new report request is the time the new report request was received, and
the report server is configured to determine whether a new report specified by the new report request was previously generated within a specified time prior to the time the new report request was received.

* * * * *